(12) United States Patent
Whitney

(10) Patent No.: US 9,945,513 B2
(45) Date of Patent: Apr. 17, 2018

(54) SUCTION CUP SECURING DEVICE INCORPORATING A BI-STABLE RIBBON SPRING

(71) Applicant: Melissa Jo Whitney, Monrovia, CA (US)

(72) Inventor: Melissa Jo Whitney, Monrovia, CA (US)

( * ) Notice: Subject to any disclaimer, the term of this patent is extended or adjusted under 35 U.S.C. 154(b) by 105 days.

(21) Appl. No.: 14/528,811

(22) Filed: Oct. 30, 2014

(65) Prior Publication Data

US 2015/0184799 A1     Jul. 2, 2015

Related U.S. Application Data

(60) Provisional application No. 61/962,086, filed on Oct. 31, 2013.

(51) Int. Cl.
| | |
|---|---|
| *F16M 13/02* | (2006.01) |
| *F16F 1/02* | (2006.01) |
| *F16B 47/00* | (2006.01) |
| *F16M 11/04* | (2006.01) |
| *F16M 11/40* | (2006.01) |

(52) U.S. Cl.
CPC .......... *F16M 13/022* (2013.01); *F16B 47/00* (2013.01); *F16B 47/003* (2013.01); *F16F 1/025* (2013.01); *F16M 11/041* (2013.01); *F16M 11/40* (2013.01); *Y10T 29/49826* (2015.01)

(58) Field of Classification Search
CPC .... F16M 13/022; F16M 11/041; F16M 11/40; F16B 47/00; F16B 47/003; F16F 1/025; Y10T 29/49826
See application file for complete search history.

(56) References Cited

U.S. PATENT DOCUMENTS

| | | | | |
|---|---|---|---|---|
| 2,310,515 A | * | 2/1943 | Chester | A61J 9/06 215/11.6 |
| 5,028,026 A | * | 7/1991 | Philipps | A47G 7/044 248/206.1 |
| 5,437,488 A | * | 8/1995 | Richmond | A63B 47/02 294/19.2 |
| 6,053,464 A | * | 4/2000 | Cardarelli | F16B 47/00 248/205.8 |
| 6,402,104 B1 | * | 6/2002 | Smith | A47K 1/09 248/205.5 |
| 7,347,019 B1 | * | 3/2008 | Shaw | F16F 1/025 40/607.01 |

(Continued)

*Primary Examiner* — John C Hong
(74) *Attorney, Agent, or Firm* — Daniel Leo

(57) ABSTRACT

A device and method for holding or securing an article against a surface using a suction cup connected to a bi-stable snap action ribbon spring. The device and method utilize the bi-stable characteristics of a snap action ribbon spring together with the adhesion characteristics of a suction cup to create a self-latching, spring-loaded mechanism for securing an article to a surface. The device and method for holding or securing an article against a surface using a suction cup connected to a bi-stable snap action ribbon spring can be used to greatly simplify the ease in draining liquid from a hollow container in an effortless manner by the use of gravity by allowing the liquid within the hollow container to accumulate or settle towards the vicinity approximate to the opening where the liquid is dispensed from.

15 Claims, 11 Drawing Sheets

(56) References Cited

U.S. PATENT DOCUMENTS 7,731,138 B2 * 6/2010 Wiesner ............. A61M 5/1415
248/160
2011/0073743 A1 * 3/2011 Shamie .................. B60R 11/02
248/537

* cited by examiner

000# SUCTION CUP SECURING DEVICE INCORPORATING A BI-STABLE RIBBON SPRING

RELATED APPLICATIONS

The present application claims priority to U.S. Provisional Patent Application No. 61/962,086, filed Oct. 31, 2013, whose contents are incorporated by reference in their entirety.

FIELD OF THE INVENTION

The present invention relates to a new and improved device and method for holding or securing an article against a surface using a suction cup connected to a bi-stable snap action ribbon spring. The field of invention covers a securing device comprised of a bi-stable snap action ribbon spring connected to a suction cup which may be used to secure or hold an article against a surface. More specifically, the present invention provides a unique device and method for holding or securing an article against a vertical or horizontal or slanted surface using a bi-stable snap action ribbon spring connected to a suction cup. The field of invention further covers securing or holding an article against any conceivable vertical, horizontal, or slanted surface where the article includes any conceivable object capable of being held or secured to a surface using a bi-stable snap action ribbon spring connected to a suction cup.

In some embodiments, the surface may be the vertical wall inside of a bathroom, such as perhaps the wall of a shower stall, or the surface might be a horizontal surface within a bathroom, such as perhaps the horizontal ledge of a bathtub, and the article may be a hollow container containing a liquid such as shampoo where the hollow container is secured against the vertical surface by use of a bi-stable snap action ribbon spring and where the bi-stable snap action ribbon spring is secured against the vertical surface by a suction cup connected to the bi-stable snap action ribbon spring. And in some embodiments, the article or hollow container that is secured to the vertical surface may be configured in such a method that the hollow container rests upon a horizontal surface. And in some embodiments, the article or hollow container that is held or secured to the vertical surface by the bi-stable snap action ribbon spring, connector, and suction cup, and configured to rest upon a horizontal surface, may be positioned in an orientation such as right-side-up or up-side-down. In some embodiments the article or hollow container may be positioned in an inverted or up-side-down orientation while held by the bi-stable snap action ribbon spring and while the connected suction cup is secured to a vertical surface so as to permit the hollow container to rest upon a horizontal surface allowing the liquid within the container to gravitate and accumulate towards the end of the container approximate to the opening nearby the vicinity where the liquid is dispensed from.

In some embodiments, the article or hollow container may be oriented right-side-up while secured to a vertical surface by use of a bi-stable snap action ribbon spring connected to a suction cup and configured in such a manner that the hollow container rests upon a horizontal surface to permit easy storage upon the horizontal surface. In some embodiments, the article or container may be oriented right-side-up while secured to a horizontal surface by use of a bi-stable snap action ribbon spring connected to a suction cup and configured in such a manner that the container rests upon a horizontal surface to permit convenient and reliable storage of the article or hollow container containing a liquid thereupon the horizontal surface thus preventing the article from being accidently knocked off of the horizontal surface resulting in unintended and wasteful drainage or spillage of liquid within the article or hollow container.

And in some embodiments, the bi-stable snap action ribbon spring connected to a suction cup may be secured to a vertical surface and configured to support an article by inserting the smaller width of that article through the center region of the bi-stable snap action ribbon spring within the stable coiled state so as to permit a second larger width of that article at an opposing article length to be supported upon the horizontal surface of the coiled spring due to the fact that the second larger width is greater than the coiled spring inner diameter of the center region thus not allowing the article to fall through the center region.

Applications of relevant use may include, but are not limited to: holding or securing a hollow container such as a shampoo bottle in an inverted up-side-down position against a tile bathroom vertical surface while the hollow container rests upon a horizontal surface; holding or securing a hollow container such as a shampoo bottle in a right-side-up orientation against a horizontal surface while the hollow container rests upon that horizontal surface; holding or securing a solid object such as a candle against a vertical surface while the candle rests upon a horizontal surface; holding or securing a solid object such as a candle against a horizontal surface while the candle rests upon that horizontal surface; or, securing a smart phone to a water bottle for easy consolidated storage of both items for use in a fitness center.

Furthermore, the securing device allows the user to store articles against a surface where the article has a large width and a small width across the length of that article and where the larger width is greater than the width of the coiled spring inner diameter to result in easy storage by inserting the article into the center region of the bi-stable snap action ribbon spring in the stable coiled state so as to allow the larger width of the article to rest upon the horizontal surface of the coiled spring.

SUMMARY OF THE INVENTION

The present invention utilizes the bi-stable characteristics of a snap action ribbon spring together with the adhesion characteristics of a suction cup to create a self-latching, spring-loaded mechanism for securing an article to a surface. The new and improved device and method for holding or securing an article against a surface using a suction cup connected to a bi-stable snap action ribbon spring can be used in a vast array of practical every day applications, including, but not limited to, greatly simplifying the ease of draining a liquid from a hollow container in an effortless manner by the use of gravity by allowing the liquid within the hollow container to accumulate or settle towards the vicinity approximate to the opening where the liquid is dispensed from the hollow container. The present invention further utilizes the bi-stable characteristics of a snap action ribbon spring together with a suction cup to create a self-latching, spring-loaded mechanism that greatly simplifies the ease of storing articles against a vertical or horizontal or slanted surface to take advantage of additional storage space within various settings, including, but not limited to, household, academic, commercial, recreational, or industrial environments.

DETAILED DESCRIPTION

Figure 1A:
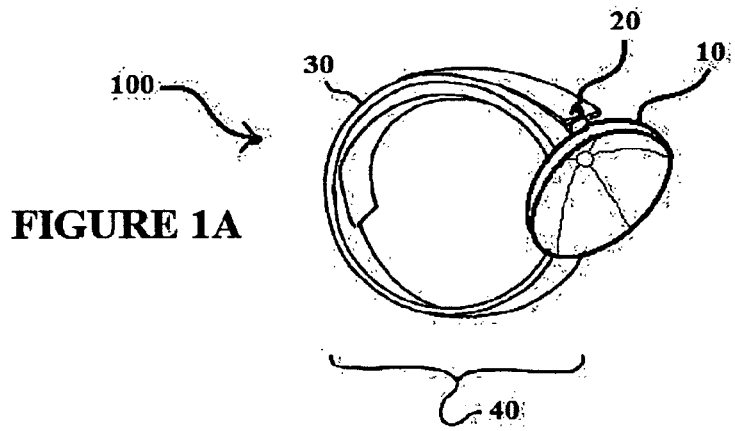
FIG. 1A shows an isometric view of one embodiment of a suction cup snap ring securing device with the bi-stable snap action ribbon spring in a stable coiled state as used in the present invention.

It is to be understood by one of ordinary skill in the art that the present discussion is a description of exemplary embodiments only, and is not intended as limiting the broader aspects of the present invention, which broader aspects are embodied in the exemplary constructions. Reference will now be made in detail to various embodiments of the invention. Each embodiment is provided by way of explanation of the invention, not limitation of the invention. In fact, it will be apparent to those skilled in the art that modifications and variations can be made in the invention without departing from the teaching and scope thereof, for instance, features illustrated or described as part of one embodiment to yield a still further embodiment derived from the teaching of the invention. Thus, it is intended that the invention cover such derivative modifications and variations to come within the scope of the invention embodiments described herein and their equivalents.

The suction cup snap-spring securing device of the present invention is comprised of a bi-stable snap action ribbon spring, a connector, and a suction cup. A "snap-spring", or bi-stable snap action ribbon spring, and sometimes within the accompanying text is also termed as a ribbon, spring, or tape, as used in the present invention, is comprised of a longitudinal tape material. Preferred tape materials are metals although polymeric materials, composite materials, or any conceivable material suitable for the application may be used as well. In some embodiments, the bi-stable snap action ribbon spring can be equipped with a sheath, possibly made of a fabric or plastic material or a synthetic rubber material such as neoprene, or any other suitable material, which covers either a portion of, or the entire perimeter or outer surface of the bi-stable snap action ribbon spring. In some embodiments, the sheath is used to protect the user from possible sharp edges of the ribbon. In other cases, the sheath is used to protect the bi-stable snap action ribbon spring from corrosion, erosion, oxidation, or any other undesirable chemical reaction which may negatively impact its longevity or functionality.

A "suction cup", as used in the present invention, is an object that uses negative fluid pressure of air or water to adhere to a surface and in the process creates a partial vacuum. The preferred type of suction cup is formed from a single piece of molded plastic or rubber material, or the like, and has a concave front face. It is to be noted that a suction cup used in the present invention is not limited to just plastic or rubber materials and any conceivable type of material may be used as long as the application of that material results in sufficient adhesion properties or characteristics to create a negative fluid pressure between the suction cup and the surface. In some embodiments, the suction cup has a neck extending outwardly from the rear face, opposite the concave front face. The neck can be located at the geometric center of the rear face of the suction cup, however in other embodiments it can be offset from the geometric center of the rear face. In other embodiments, the suction cup does not have a neck extending outwardly from the rear face, opposite the concave front face.

The connector is the connecting link between the suction cup and the bi-stable snap action ribbon spring. Any conceivable way to connect the suction cup and the bi-stable snap action ribbon spring falls within the scope and spirit of the present invention. A connector is affixed to the suction cup and to the bi-stable snap action ribbon spring and may be permanently mounted or removable. In some non-limiting embodiments, the connector may be constructed of hard plastic or metal or any type of polymer or composite material sufficient to affix to the suction cup to the bi-stable snap action ribbon spring. In other embodiments the connector is affixed to the neck of the suction cup. In other embodiments the connector may be mounted directly to the rear face of the suction cup.

A connector may also seamlessly adhere the bi-stable snap action ribbon spring to the suction cup in a manner that connects the bi-stable snap action ribbon spring to the suction cup. In some embodiments, the connector may comprise an adhesive material. The adhesive material may be any conceivable substance used for connecting the suction cup to the bi-stable snap action ribbon spring, including, but not limited to glue, fixative, cement, epoxy, a polymer or the like. The adhesive connector may also include affixing the suction cup to the bi-stable snap action ribbon spring by way of any conceivable heat treatment process that results in the bi-stable snap action ribbon spring being affixed to the suction cup. For example, one version of an adhesive connector may be realized by heat treatment, such as melting or softening, of at least a portion of the rear face or neck of the suction cup so that the bi-stable snap action ribbon spring is affixed to the suction cup.

In other embodiments, if the bi-stable snap action ribbon spring is equipped with a sheath covering at least a portion of the longitudinal tape, one version of an adhesive connector may be realized by heat treatment, such as melting or softening, of at least a portion of the sheath so that the bi-stable snap action ribbon spring is affixed to the suction cup. In other embodiments, an adhesive connector may be realized by heat treatment, such as melting or softening, of at least a portion of the bi-stable snap action ribbon spring so as to affix the bi-stable snap action ribbon to the suction cup. In other embodiments, if the bi-stable snap action ribbon spring is equipped with a sheath covering at least a portion of the longitudinal tape, one version of an adhesive connector is the sheath itself where the sheath that covers the bi-stable snap action ribbon spring also functions as the adhesive connector for securing the suction cup to the bi-stable snap action ribbon spring. For example, in one preferred but non-limiting embodiment, a bi-stable snap action ribbon spring contains a sheath comprised of a synthetic rubber such as neoprene or perhaps nitrile. Additionally, during the manufacture of the suction cup snap-spring securing device, a liquid synthetic rubber material may be applied to the outer surface of the bi-stable snap action ribbon spring, and then the suction cup may be affixed to the bi-stable snap action ribbon spring, and then when the synthetic rubber material of the sheath dries, the sheath essentially functions as an adhesive connection between the bi-stable snap action ribbon spring and the suction cup.

In some embodiments the connector may include a fastening member which joins the suction cup to the bi-stable snap action ribbon spring in a manner that allows for removal of the bi-stable snap action ribbon spring from the suction cup so as to permit the suction cup to remain in place.

A bi-stable snap action ribbon spring used according to the present invention is formed to be preferentially coiled along the tape longitudinal axis and has a preferred arcuate cross-section as viewed perpendicular to (or along) the longitudinal tape axis. A proposed explanation of the behavior of a bi-stable snap action ribbon spring is as follows:

1) When in a stable coiled state, the longitudinal stresses of the snap-spring (or ribbon) are generally relieved. The coiling of the ribbon also acts to flatten the arcuate cross-section, which strains the ribbon in the transverse direction.

2) By applying a longitudinal or tensional force, the ribbon can be progressively uncoiled which imparts longitudinal strain to the uncoiled portion of the ribbon. Also, as the ribbon is uncoiled, the transverse strain is relieved as the ribbon returns to its arcuate cross-section.

3) As the ribbon is fully uncoiled and extended into a linear state, the formation of the arcuate cross-section progresses along the full length of the ribbon.

4) When the ribbon is fully extended, a "snap" occurs as the transverse strain is relieved.

5) In the fully extended, stable linear state, the arcuate cross-section has a bending moment of inertia that resists the longitudinal coiling stresses developed as a result of the straightening or uncoiling of the ribbon. Thus the ribbon can remain in this linear configuration and resists recoiling. The ribbon is also characterized as having a degree of column stiffness and therefor has a degree of bending resistance.

6) Affecting a "snap", the linear ribbon is buckled and the arcuate cross-section is flattened in the buckled area, inducing transverse strain. The longitudinal stresses will induce a recoiling of the ribbon.

7) The recoiling of the ribbon initiates at the point of buckling and progresses down the length of the ribbon as the longitudinal coiling stresses are relieved and the transverse flattening stresses are accumulated.

8) When fully recoiled, the ribbon assumes the stable coiled state of step 1) above.

A bi-stable snap action ribbon spring, as used in the present invention, therefore has a stable "coiled" state and a stable "linear" state. While in a stable linear state, the application of a "snap" or buckling force will initiate a progressive self-coiling of the ribbon. If the ribbon is essentially unconstrained, the self-coiling will continue until the ribbon is fully coiled upon itself, or in the context of this invention, coiled around an article, such as around the outer circumference or perimeter of an article, such as either a hollow container or a solid object. While in this stable coiled state, the application of linear tension will force the coiled ribbon back to a stable linear state and by the application of a final "snap" the ribbon will remain in this linear configuration. A bi-stable snap action ribbon spring can therefore self-transition from a stable linear state to a stable coiled state upon the application of a "snap" or buckling force to the spring while in a stable linear state.

The suction cup connected to the bi-stable snap action ribbon spring holds or secures an article, including but not limited to hollow container or solid object, against a surface when in the stable "coiled" state. The surface may either be a vertical, horizontal, or slanted surface. Further, the surface may be fixed in a discrete location or arbitrary in a three dimensional space.

FIG. 1A shows an isometric view of a suction cup snap-spring securing device (100) for holding or securing an article against a surface using a suction cup (10) with a connector (20) and a bi-stable snap action ribbon spring (30). For exemplary purposes, the connector (20) shown in FIGS. 1A, 1B, 1C, 2A, 2B, 3A, 3B, 7A, 7B, 9A, and 9B, is portrayed as that of a circular ring-type connector (20a). From a practical perspective, the connector (20) or circular ring-type connector (20a) portrayed in FIGS. 1A, 1B, 1C, 2A, 2B, 3A, 3B, 7A, 7B, 9A, and 9B may in practice be selected from a vast array of commercially available materials or items, including but not limited to, a loop, split ring, tang ring, crimp ring, heavy gauge wire, cotter ring, hinged binder ring, or the like, fabricated from any sort of materials such as a metal, polymer, a composite or organic material or any other conceivable type of composition or material. In other embodiments the connector (20) may be triangular, elliptical, square, or rectangular in shape or any other shape. In other embodiments the connector (20) might include a beaded chain, string, or a mating female and male connector such as a nipple and groove or slat and pin, or button, or Velcro™ or adhesive or any other conceivable type of device or material which makes it possible to connect the suction cup (10) to the bi-stable snap action ribbon spring (30).

FIGS. 1A, 1B, 1C, 2A, 2B, 3A, 3B, 7A, 7B, 9A, and 9B show the connector (20) secured to both the suction cup (10) and to the bi-stable snap action ribbon spring (30) where the connector (20) is of a circular ring-type connector (20a) and is the connecting link between the suction cup (10) and the bi-stable snap action ribbon spring (30) and secures the suction cup (10) to the bi-stable snap action ribbon spring (30) through a hole (15) on the stem of the suction cup (10) and a hole (25) at one end of the bi-stable snap action ribbon spring (30).

For example, in one preferred but non-limiting embodiment shown in each of FIGS. 1A, 1B, 1C, 2A, 2B, 3A, 3B, 7A, 7B, 9A, and 9B the connector (20) is a circular ring-type connector (20a) which in practice might be an inexpensive 9/16" outer diameter metal split ring, such as that offered by McMaster-Carr™ Item #90905A651. Either end of the circular ring-type connector (20a) can be pried open and inserted through a hole (15) in the suction cup (10) and also inserted through a hole (25) at a region of the bi-stable snap action ribbon spring (30) to be slid along the spiral of the split ring circular ring-type connector (20a) until both the suction cup (10) and bi-stable snap action ribbon spring (30) become engaged into the split ring circular ring-type connector (20a). In one embodiment, the hole (15) in the suction cup (10) may be made in the neck of the suction cup (10). In other embodiments, the hole (15) in the suction cup (10) may be made in the directly in a portion of the rear face of the suction cup sufficient to not disturb the functionality and suction properties of the suction cup (10).

The embodiment shown in FIGS. 1A, 1B, 1C, 2A, 2B, 3A, 3B, 7A, 7B, 9A, and 9B show the hole (25) in the bi-stable snap action ribbon spring (30) towards an end region of the bi-stable snap action ribbon spring (30), however in other embodiments the hole (25) can be positioned at any length throughout the entire spring length (90). The function of the connector (20) serves to connect the suction cup (10) to the bi-stable snap action ribbon spring (30). FIG. 1A shows the bi-stable snap action ribbon spring (30) in a stable coiled state (40).

Figure 1B:
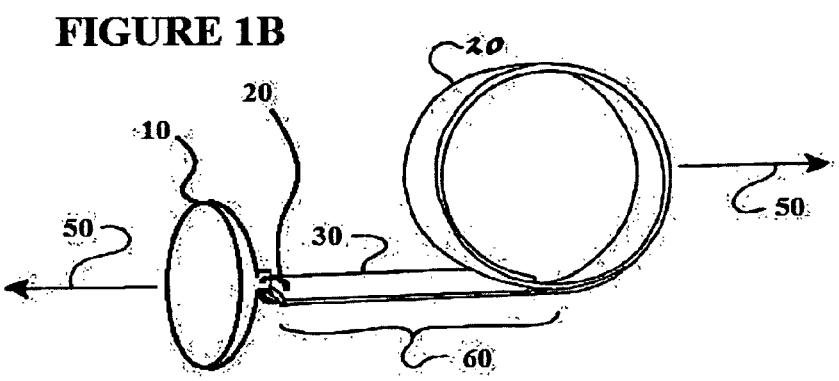
FIG. 1B is isometric view showing one embodiment of a suction cup snap ring securing device with the bi-stable snap action ribbon spring partially uncoiled in a transition state.
Figure 1C:
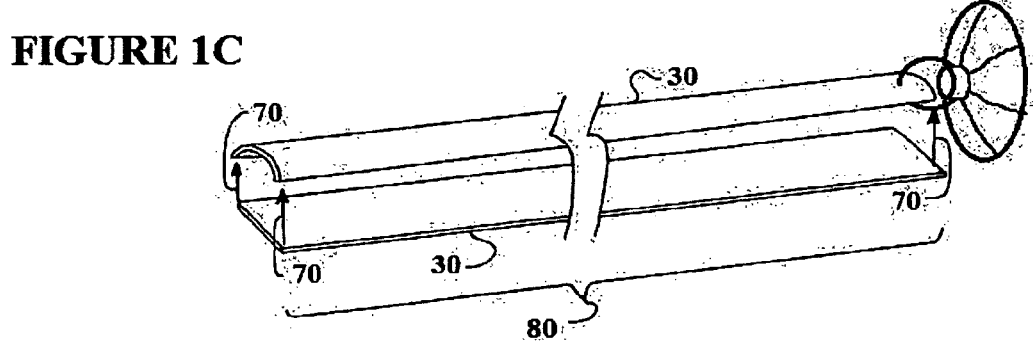
FIG. 1C is an isometric view of one embodiment of a suction cup snap ring securing device with the bi-stable snap action ribbon spring in a stable linear state. Shown is a "snap" applied to the spring, which forces the spring to assume an arcuate cross-section.

As shown in isometric view FIG. 1B, the bi-stable snap action ribbon spring (30) can be un-coiled by the application of a tensile force (50), which progressively forms a linear portion (60) of the bi-stable snap action ribbon spring (30). When the bi-stable snap action ribbon spring (30) is fully un-coiled, a user-induced "snap" (70) stabilizes the bi-stable snap action ribbon spring (30) into a stable linear state (80) as shown in FIG. 1C. The total spring length (90) can be most easily visualized in FIG. 1C while the bi-stable snap action ribbon spring (30) is fully un-coiled while in the stable linear state (80).

Figure 2A:
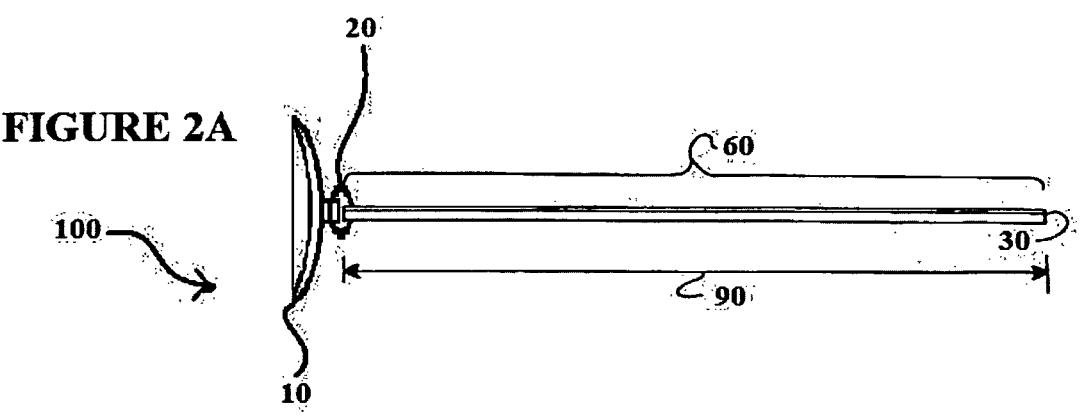
FIGS. 2A and 2B show typical side and cross-sectional end views of one embodiment of a suction cup snap ring securing device with the bi-stable snap action ribbon spring while in stable linear state.
Figure 2B:
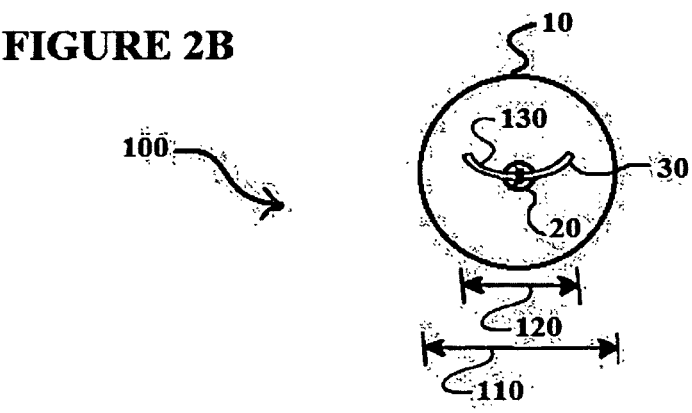

FIGS. 2A and 2B show typical side and cross-sectional end views of a suction cup snap-spring securing device (100) of the present invention, respectively. Shown in FIG. 2A is a side plan view of a suction cup snap-spring securing device (100) with a bi-stable snap action ribbon spring (30) in a stable linear state (80) and also having a spring length (90). Shown in FIG. 2B is a cross-sectional end view of the suction cup snap-spring securing device (100) with the bi-stable snap action ribbon spring (30) (of FIG. 2A), suction cup (10), and connector (20), displayed as a circular ring-type connector (20a), while also displaying a suction cup diameter (110) and a linear spring width (120) while in a stable linear state (80). Also shown in FIG. 2B is a typical arcuate cross-sectional shape (130) characteristic of a bi-stable snap action ribbon spring (30) while in a stable linear state (80).

Figure 3A:
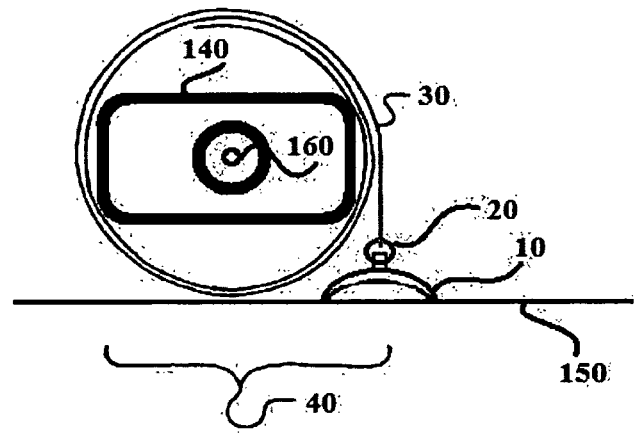
FIG. 3A depicts a bottom plan view of one embodiment of a suction cup snap ring securing device with suction cup, connector, and bi-stable snap action ribbon spring while in a stable coiled state securing an article against a vertical surface while the article also rests upon a horizontal surface.

In comparison, FIG. 3A depicts a bottom plan view of the suction cup snap-spring securing device (100) with a suction cup (10), connector (20), and bi-stable snap action ribbon spring (30) while in a stable coiled state (40). FIG. 3A illustrates the suction cup snap-spring securing device (100) securing or holding an article (140), such as a hollow container (140a), such as a shampoo bottle (139), while the suction cup (10) is secured to a vertical surface (145), such as a wall (150), so as to allow liquid (170) within the hollow container (140a) to be drained in an effortless manner by the use of gravity forcing the liquid within the hollow container (140a) to gravitate towards the opening (160) of the hollow container (140a) where the liquid (170) is dispensed from. FIG. 3A also displays the width (W1) of the article (140) being lesser than the coiled spring inner diameter (D1) and resultantly the bi-stable snap action ribbon spring (30) wraps around the circumference or perimeter of the hollow container (140a) so as to utilize the connector (20) connected to the suction cup (10) which in turn is secured to the vertical surface (145) or wall (150).

Figure 3B:
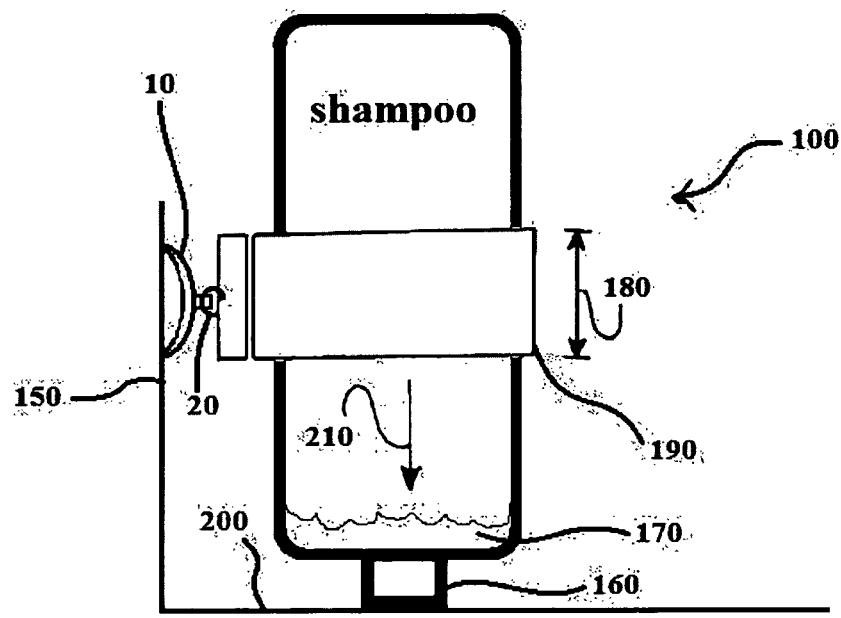
FIG. 3B shows an end view of one embodiment of a suction cup snap ring securing device with suction cup, connector, and bi-stable snap action ribbon spring while in a stable coiled state securing an article against a vertical surface while the article also rests upon a horizontal surface.
Figure 4A:
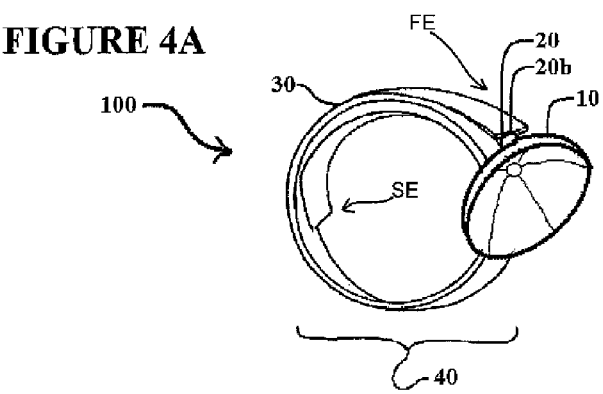
FIG. 4A shows an isometric view of another embodiment of a suction cup snap ring securing device with the bi-stable snap action ribbon spring in a stable coiled state as used in the present invention.
Figure 4B:
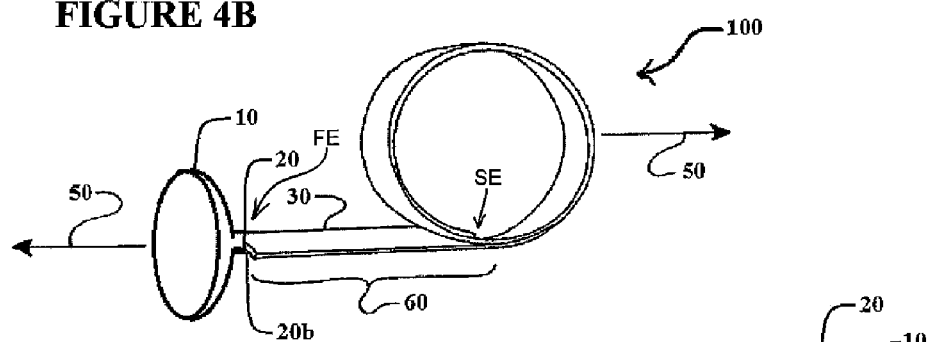
FIG. 4B is isometric view showing another embodiment of a suction cup snap ring securing device with the bi-stable snap action ribbon spring partially uncoiled in a transition state.
Figure 4C:
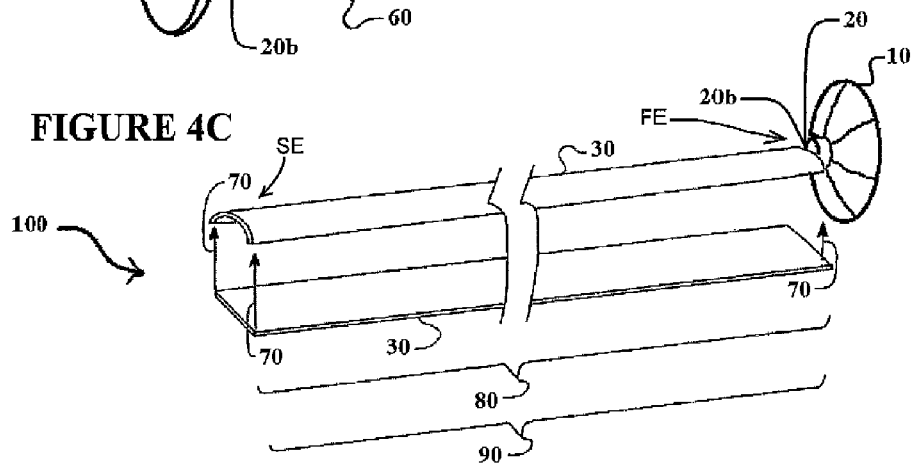
FIG. 4C is an isometric view of another embodiment of a suction cup snap ring securing device with the bi-stable snap action ribbon spring in a stable linear state. Shown is a "snap" applied to the spring, which forces the spring to assume an arcuate cross-section.
Figure 5A:
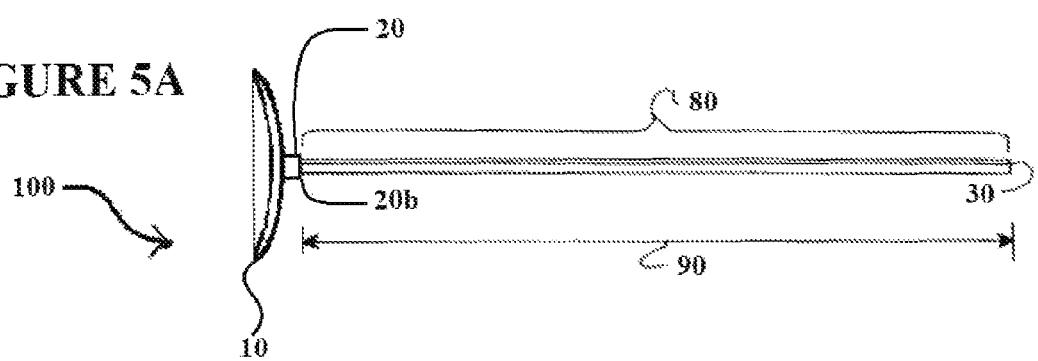
FIGS. 5A and 5B show typical side and cross-sectional end views of another embodiment of a suction cup snap ring securing device with the bi-stable snap action ribbon spring while in stable linear state.
Figure 5B:
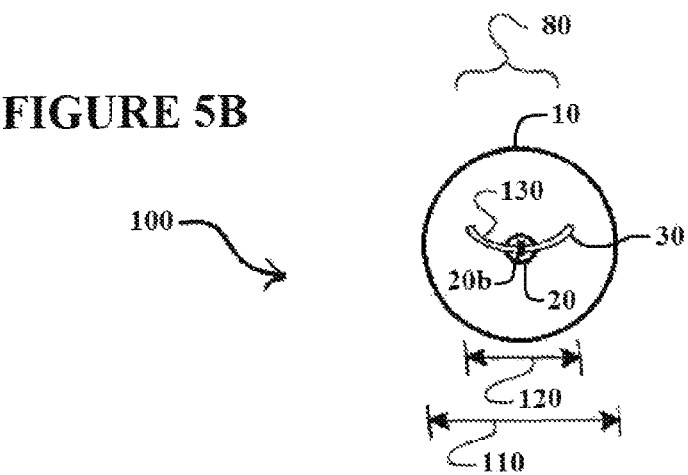
Figure 6A:
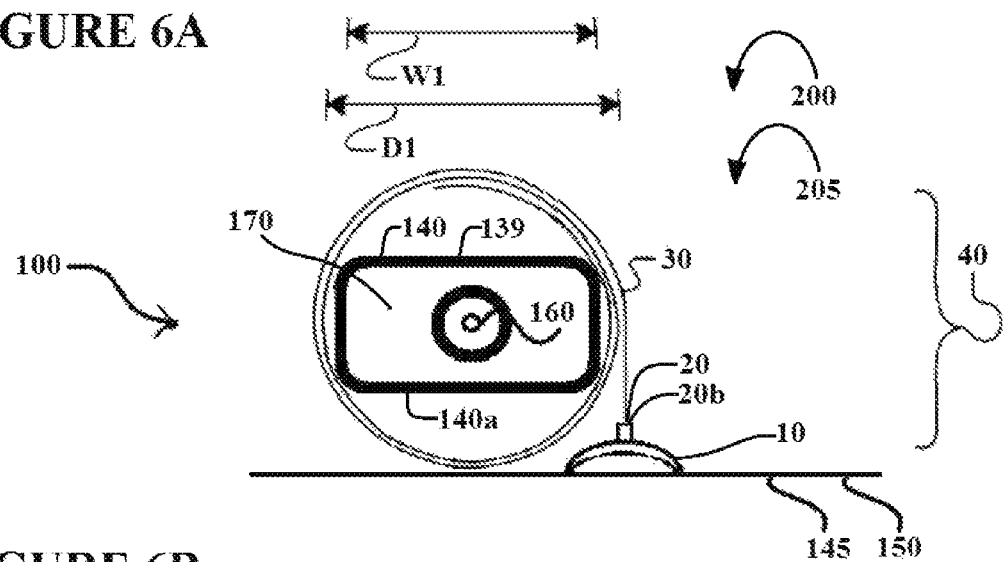
FIG. 6A depicts a bottom plan view of another embodiment of a suction cup snap ring securing device with suction cup, connector, and bi-stable snap action ribbon spring while in a stable coiled state securing an article against a vertical surface while the article also rests upon a horizontal surface.
Figure 6B:
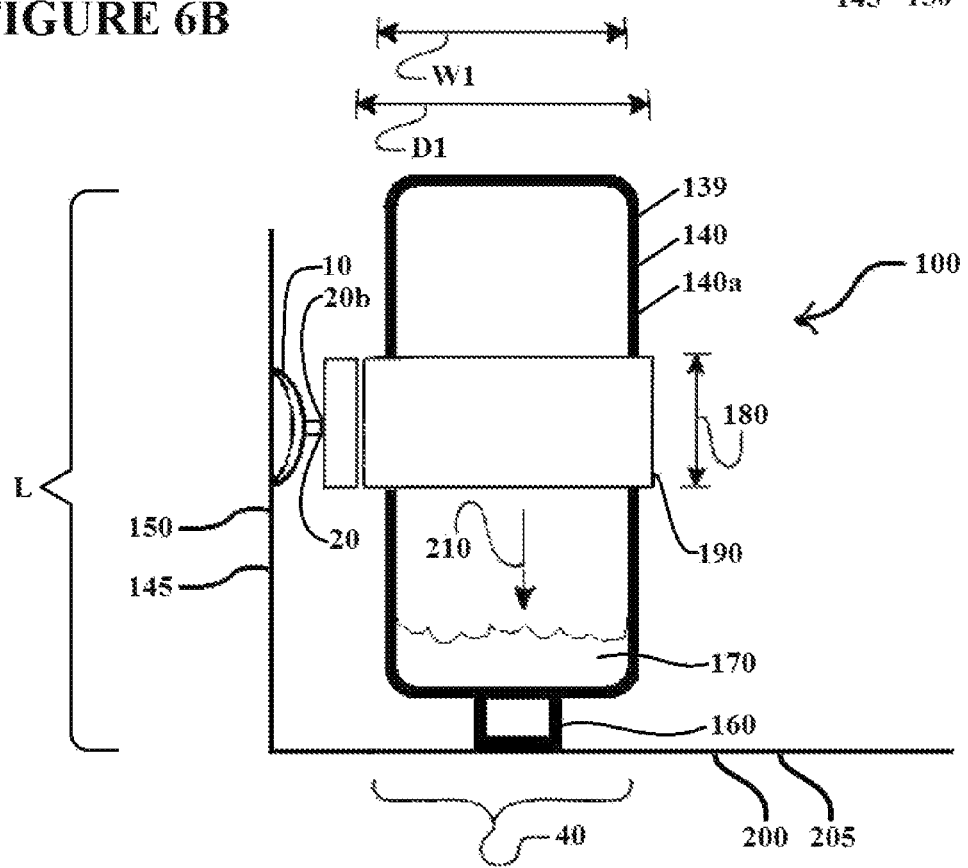
FIG. 6B shows an end view of another embodiment of a suction cup snap ring securing device with suction cup, connector, and bi-stable snap action ribbon spring while in a stable coiled state securing an article against a vertical surface while the article also rests upon a horizontal surface.

FIG. 3B shows the hollow container (140a) secured by the suction cup snap-spring securing device (100) in an inverted or up-side-down orientation so the liquid (170) contents within the hollow container (140a) may accumulate or settle via gravity towards the vicinity approximate to the opening (160) of the hollow container (140a). It is to be noted that an up-side-down orientation refers to an inverted position of the hollow container with respect to the position of the opening (160) facing a downward direction so as to allow liquid (170), to accumulate or settle via gravity for ease in being dispensed from the hollow container (140a). Further, it is to be noted that some articles (140), such as a hollow container (140a) containing a liquid (170) may be designed and manufactured and purchased already in an inverted position or up-side-down orientation where the opening (160) is already positioned at the bottom of the hollow container (140a). In these instances, the description of right-side-up and/or up-side-down herein described is non-limiting and not of any particular use other than describing a method of using the inventive device so that one possessing an ordinary skill in the art can make and use the invention as intended by the inventor.

FIG. 3B shows an end view of the suction cup snap-spring securing device (100) (of FIG. 3A) displaying a coiled spring width (180) while in a stable coiled state (40). Also shown in FIG. 3B is a typical flat cross-sectional shape (190) characteristic of a bi-stable snap action ribbon spring (30) while in a stable coiled state (40). The coiled spring width (180) is greater than the linear spring width (120) (shown in FIG. 2B). Thus while in a stable linear state (80) a bi-stable snap action ribbon spring (30) will assume an arcuate cross-sectional shape (130) (shown in FIG. 2B) and while in a stable coiled state (40) a bi-stable snap action ribbon spring (30) will assume a flat cross-sectional shape (190). The hollow container (140a) shown in FIG. 3B is portrayed in an inverted or up-side-down orientation so as to allow liquid (170) contained therein to settle towards the vicinity nearby or proximate the opening (160) through which liquid (170) is dispensed from the hollow container (140a).

Also shown in FIG. 3B is the suction cup snap-spring securing device (100) holding a hollow container (140a) in an inverted or up-side-down orientation against a vertical surface (145), such as a wall (150), also while the opening (160) of the hollow container (140a) rests, or is placed upon, or is supported upon a horizontal surface (200), such a bathtub ledge (205). In an alternate embodiment, the suction cup snap-spring securing device (100) may be configured to hold or secure a hollow container (140a) in an inverted or up-side-down orientation against a slanted surface (155) (not shown) as opposed to a vertical surface (145), where that slanted surface (155) (not shown) is the side of bathtub (156) (not shown). And accordingly, the hollow container (140a) may rest a horizontal surface (200), such as that of the bathtub floor (208) (not shown).

FIG. 3B shows the suction cup (10) secured to a vertical surface (145), or wall (150), so as to allow the liquid (170) contained within the hollow container (140a) to be drained in an effortless manner by the use of gravity forcing the liquid (170) within hollow container (140a) to accumulate or settle via gravitational forces in a downward direction (210) towards the opening (160) of the hollow container (140a) where the liquid (170) is dispensed from. FIG. 3B also displays the width (W1) of the article (140) being lesser than the coiled spring inner diameter (D1) and resultantly the bi-stable snap action ribbon spring (30) wraps around the perimeter of the hollow container (140a) so as to secure it to the suction cup (10) which is in turn secured to the vertical surface (145) or wall (150).

FIGS. 4A, 4B, 4C, 5A, 5B, 6A, 6B, 10A, 10B, represent and portray all features and aspects of FIGS. 1A, 1B, 1C, 2A, 2B, 3A, 3B, 9A, and 9B except that the connector (20) shown in FIGS. 4A, 4B, 4C, 5A, 5B, 6A, 6B, 10A, 10B, is portrayed that of as an adhesive (20b). The adhesive (20b) connector (20) may be any conceivable substance used for connecting or sticking the suction cup (10) to the bi-stable snap action ribbon spring (30). Furthermore, FIGS. 4A, 4B, 4C, 5A, 5B, 6A, and 6B differ from that of FIGS. 1A, 1B, 1C, 2A, 2B, 3A, and 3B in that since a circular ring-type connector (20a) is not used, there is no need for a hole (15) in the suction cup (10) and similarly, there is no need for the hole (25) in the bi-stable snap action ribbon spring (30). All other aspects of the suction cup snap-spring securing device (100) including descriptions thereof and methods and manners of use are identical. Therefore a full and enabling disclosure including the best mode known to the inventor for all aspects and features illustrated in FIGS. 4A, 4B, 4C, 5A, 5B, 6A, and 6B is provided above in the description of FIGS. 1A, 1B, 1C, 2A, 2B, 3A, and 3B.

The bi-stable snap action ribbon spring (30) has a first end (FE) and a second end (SE). The connector (20) connects the first end (FE) of the bi-stable snap action ribbon spring (30) to the suction cup (10). In the stable coiled state (40), the bi-stable snap action ribbon spring (30) secures an article with the second end (SE) in contact with said article. In the stable linear state (80), the bi-stable snap action ribbon spring (30) no longer secures the article and the second end (SE) is free of said article.

Figure 7A:
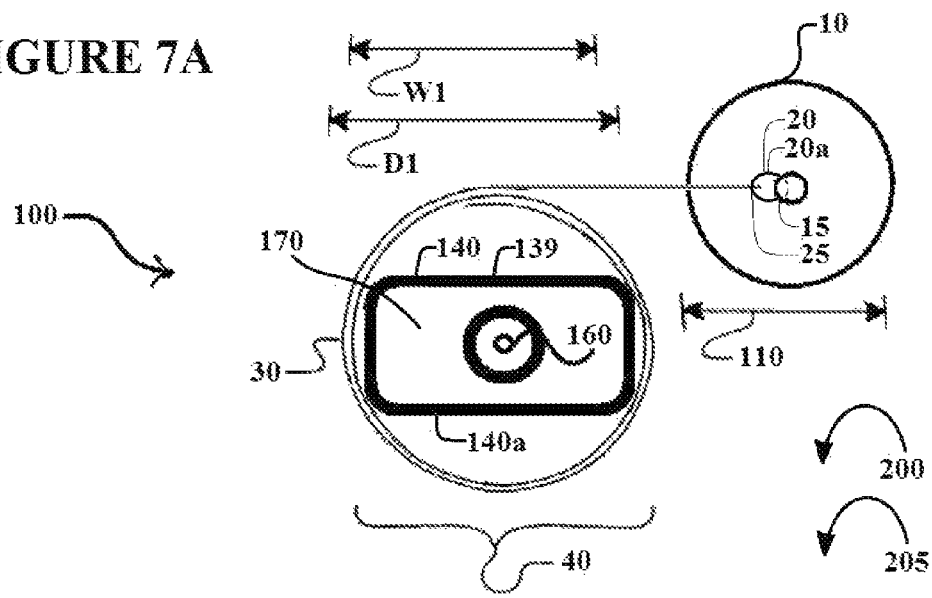
FIG. 7A depicts a top plan view of another embodiment of a suction cup snap ring securing device with suction cup, connector, and bi-stable snap action ribbon spring while in a stable coiled state securing an article against a horizontal surface while the article also rests upon a horizontal surface.
Figure 7B:
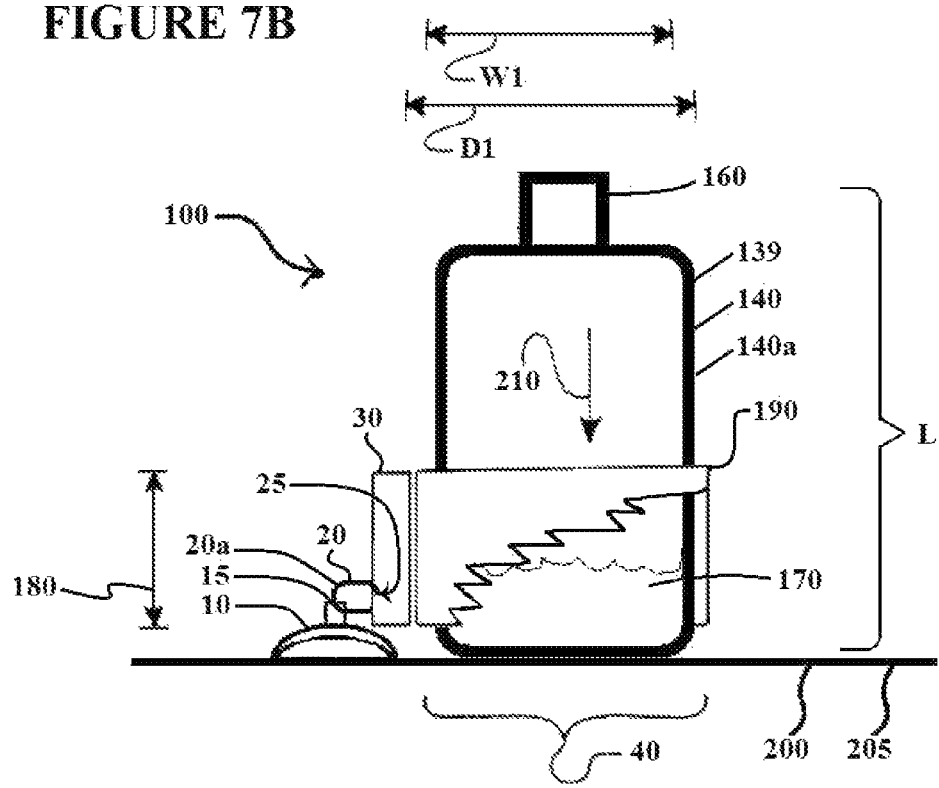
FIG. 7B shows an end view of another embodiment of a suction cup snap ring securing device with suction cup, connector, and bi-stable snap action ribbon spring while in a stable coiled state securing an article against a horizontal surface while the article also rests upon a horizontal surface.

FIG. 7A depicts a top plan view of the suction cup snap-spring securing device (100) with a suction cup (10), connector (20), and bi-stable snap action ribbon spring (30) while in a stable coiled state (40). When viewed from above, the opening (160) of the hollow container (140a) is visible since the hollow container (140a) is oriented in a right-side-up orientation. FIGS. 7A and 7B depict the connector (20) as a circular ring-type connector (20a) similar to that shown in FIGS. 3A and 3B where the connector (20) serves as a connecting link between the suction cup (10) and the bi-stable snap action ribbon spring (30) by use of a hole (15) placed in the suction cup (10) and a hole (25) placed in the bi-stable snap action ribbon spring (30). FIG. 7A shows the suction cup snap-spring securing device (100) securing or holding an article (140) such as a hollow container (140a) while the suction cup (10) is secured to a horizontal surface (200), such as a bathtub ledge (205).

FIG. 7B shows an end view of the suction cup snap-spring securing device (100) (of FIG. 7A) displaying a coiled spring width (180) while in a stable coiled state (40). FIG. 7B shows the hollow container (140a) secured by the suction cup snap-spring securing device (100) in a right-side-up orientation so the liquid (170) contents within the hollow container (140a) may accumulate or settle via gravity towards the vicinity opposite to the opening (160) of the hollow container (140a). FIGS. 7A and 7B also display the width (W1) of the article (140) being lesser than the coiled spring inner diameter (D1) and resultantly the bi-stable snap action ribbon spring (30) wraps around the perimeter of the hollow container (140a) so as to secure the article (140) to the suction cup (10) which is in turn secured to the vertical surface (145) or wall (150). The article (140) also has a length (L).

FIG. 7B shows a cut-away-section of the bi-stable snap action ribbon spring (30) portion of the suction cup snap-spring securing device (100) to illustrate how liquid (170) within the right-side-up oriented hollow container (140a) may accumulate or settle via gravity in a downward direction (210) towards the vicinity opposite to the opening (160) of the hollow container (140a). Also shown in FIG. 7B is a typical flat cross-sectional shape (190) characteristic of a bi-stable snap action ribbon spring (30) while in a stable coiled state (40). The hole (25) in the bi-stable snap action ribbon spring (30) where the circular ring-type connector (20a) is inserted through can be positioned at any position throughout the coiled spring width (180). FIG. 7B illustrates that the hole (25) within the bi-stable snap action ribbon spring (30) for connection to the suction cup (10) is located in a lower most vertical region on the coiled spring width (180). FIG. 7B also shows the suction cup snap-spring securing device (100) holding a hollow container (140a) against a horizontal surface (200), such as a bathtub ledge (205), also while the hollow container (140a) rests, or is placed upon, or is supported upon that same surface (200, 205). The suction cup (10) is secured to a horizontal surface (200), so as to allow the hollow container (140a) to be securely stored in a fixed place without concern for inadvertent displacement from that specific discrete location resulting in accidental spillage or unintended draining of the liquid (170) within the hollow container (140a).

Figure 8A:
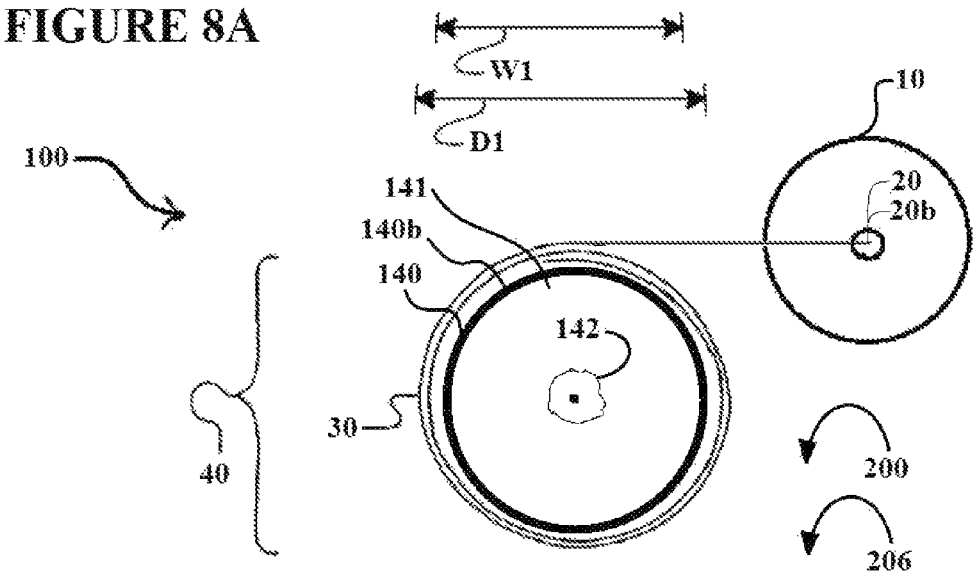
FIG. 8A depicts a top plan view of another embodiment of a suction cup snap ring securing device with suction cup, connector, and bi-stable snap action ribbon spring while in a stable coiled state securing an article against a horizontal surface while the article also rests upon a horizontal surface.
Figure 8B:
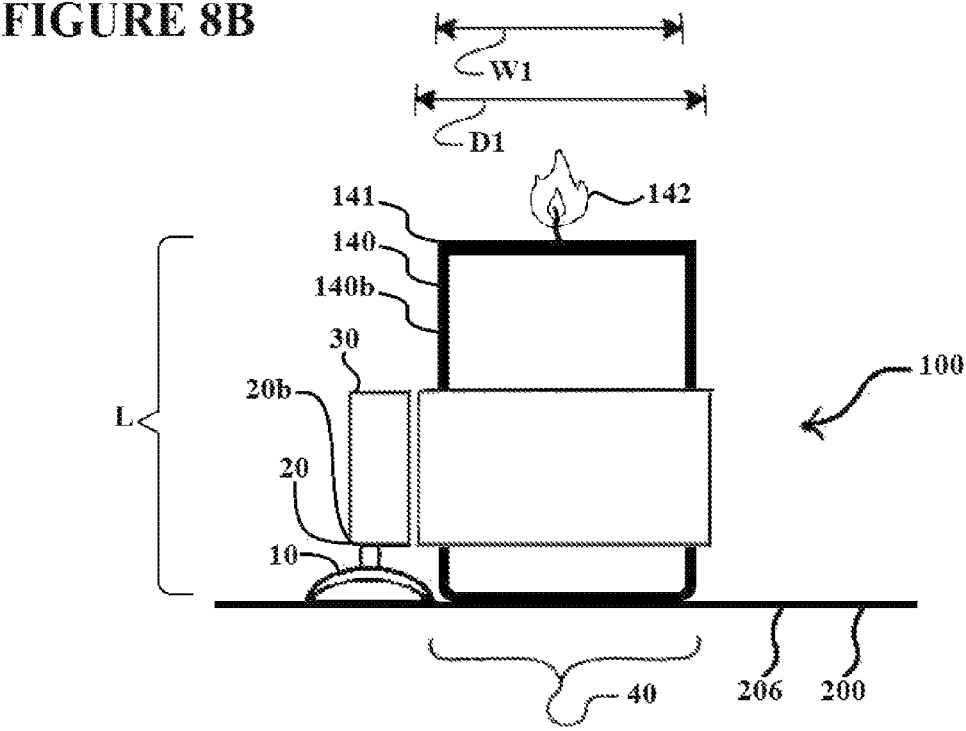
FIG. 8B shows an end view of another embodiment of a suction cup snap ring securing device with suction cup, connector, and bi-stable snap action ribbon spring while in a stable coiled state securing an article against a horizontal surface while the article also rests upon a horizontal surface.

FIG. 8A depicts a top plan view of the suction cup snap-spring securing device (100) with a suction cup (10), connector (20), and bi-stable snap action ribbon spring (30) while in a stable coiled state (40). FIG. 8A shows the suction cup snap-spring securing device (100) securing or holding an article (140) such as a solid object (140b), in this case, a candle (141), while the suction cup (10) is secured to a horizontal surface (200), such as a fireplace mantle (206). When viewed from above, the solid object (140b) or specifically, the flame (142) of the candle (141), is visible. FIGS. 8A and 8B depict the connector (20) as an adhesive (20b) similar to that shown in FIGS. 6A and 6B.

Shown in FIG. 8B is an end view of the suction cup snap-spring securing device (100) (of FIG. 8A) displaying the bi-stable snap action ribbon spring (30) in a stable coiled state (40) while securing or holding an article (140), that being a solid object (140b), or a candle (141) against a horizontal surface (200) such as a fireplace mantle (206). The suction cup (10) is secured to a horizontal surface (200) so as to allow the candle (141) to be securely stored in a fixed place without concern for inadvertent displacement from that specific discrete location resulting in an uncontrollable and accidental fire.

Figure 9A:
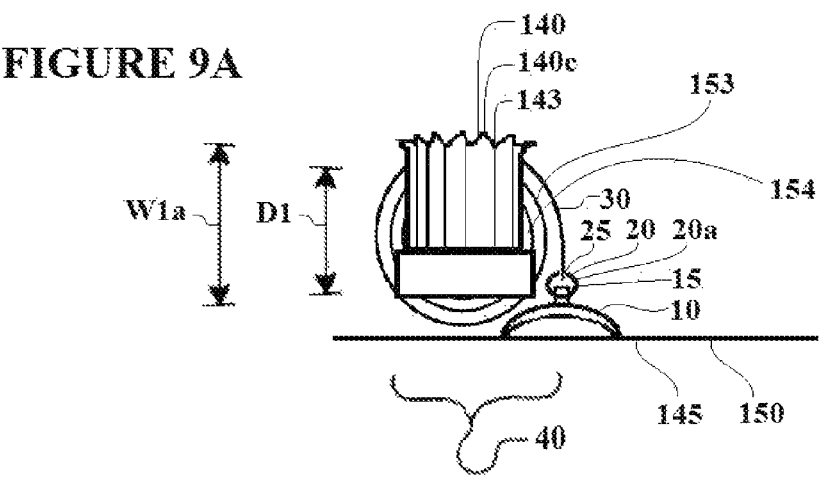
FIG. 9A depicts a top plan view of one embodiment of a suction cup snap ring securing device with a suction cup, connector, and bi-stable snap action ribbon spring while in a stable coiled state supporting an article while secured against a vertical surface.

FIG. 9A depicts a top plan view of the suction cup snap-spring securing device (100) with a suction cup (10), connector (20), and bi-stable snap action ribbon spring (30) while in a stable coiled state (40) and while holding or securing an article (140) against a vertical surface (145). When viewed from above, the suction cup (10) of the suction cup snap-spring securing device (100) is secured to a vertical surface (145), such as a wall (150), and the connector (20), connects the suction cup (10) to the bi-stable snap action ribbon spring (30) which is portrayed in a stable coiled state (40) having a center region (154) therein comprising a coiled spring inner diameter (D1). FIG. 9A shows a top view of an article (140), such as a solid object (140b), and specifically a brush (143), such as a toothbrush, where the solid object (140b) or brush (143) has as larger width (W1a) that is greater than the coiled spring inner diameter (D1). Resultantly, since the larger width (W1a) of the brush (143) is greater than the coiled spring inner diameter (D1) of the center region (154), the brush (143) cannot fall through the center region (154) and instead rests upon the horizontal surface of the coiled spring (153). Since the larger width (W1a) of the article (140) is greater than the coiled spring inner diameter (152), the solid object (140b) or brush (143) rests upon the horizontal surface of the coiled spring (153) so as to permit reliable and convenient storage of the solid object (140b) or brush (143) against a vertical surface (145), such as a wall (150), perhaps a tile wall in a shower stall.

Figure 9B:
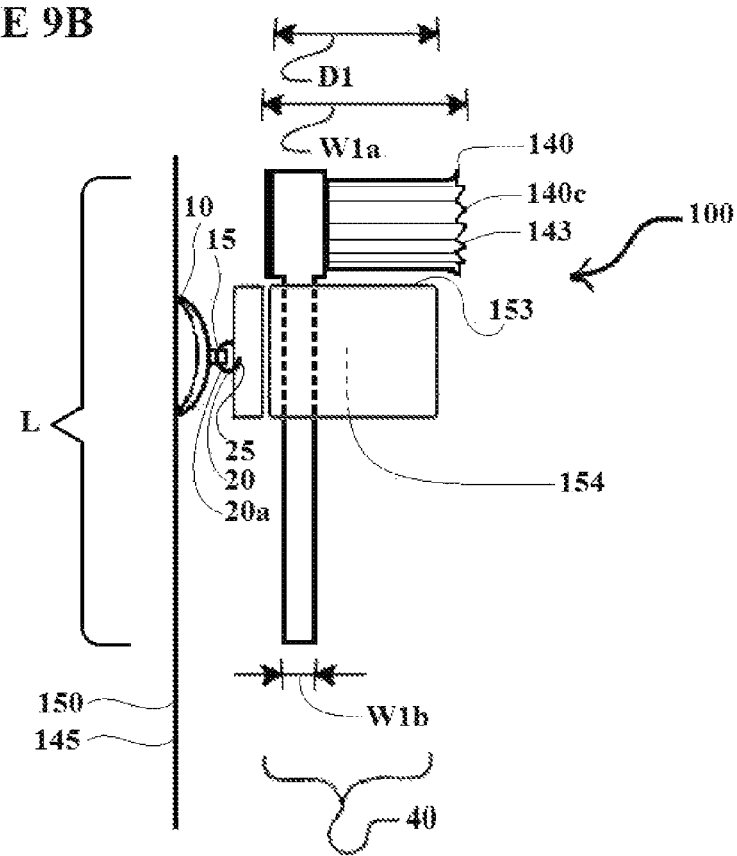
FIG. 9B shows an end view of one embodiment of a suction cup snap ring securing device with a suction cup, connector, and bi-stable snap action ribbon spring while in a stable coiled state supporting an article while secured against a vertical surface.

FIGS. 9A and 9B depict the connector (20) as a circular ring-type connector (20a) similar to that shown in FIGS. 3A and 3B where the connector (20) serves as a connecting link between the suction cup (10) and the bi-stable snap action ribbon spring (30) by use of a hole (15) placed in the suction cup (10) and a hole (25) placed in the bi-stable snap action ribbon spring (30).

Shown in FIG. 9B is an end view of the suction cup snap-spring securing device (100) (of FIG. 9A) while in a stable coiled state (40) and having a center region (154). FIG. 9B shows an article (140), such as a solid object (140b), and specifically a brush (143), such as a toothbrush, having a larger width (W1a), a smaller width (W1b), and a length (L). The smaller width (W1b) end of the brush (143) is inserted through the center region (154) of the bi-stable snap action ribbon spring (30) within the stable coiled state (40) until the larger width (W1a) end of the brush (143) at the opposing end of the bush (143) length (L) rests upon the horizontal surface of the coiled spring (153). And since the solid object (140b), or brush (143), has a larger object width (W1a) greater than the coiled spring inner diameter (D1) of the center region (154) of the coiled bi-stable snap action ribbon spring (30), the solid object (140b) or brush (143) cannot fall through the center region (154) and instead rests upon the horizontal surface of the coiled spring (153) so as to permit reliable and convenient storage of the solid object (140b) or brush (143) against a vertical surface (145), such as a wall (150), perhaps a wall of a shower stall.

Figure 10A:
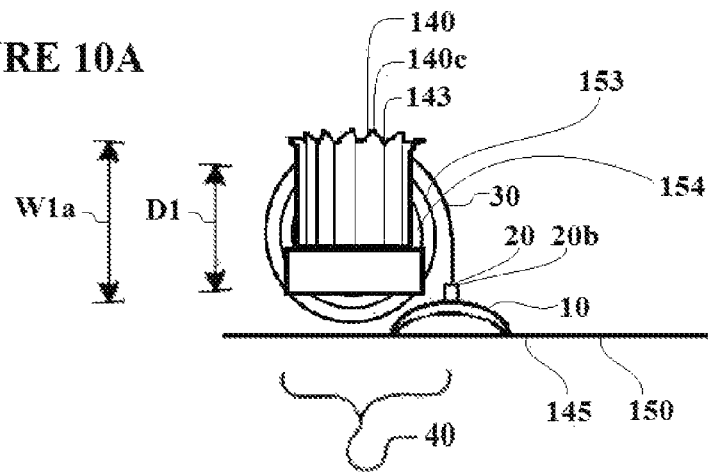
FIG. 10A depicts a top plan view of one embodiment of a suction cup snap ring securing device with a suction cup, connector, and bi-stable snap action ribbon spring while in a stable coiled state securing an article against a vertical surface.
Figure 10B:
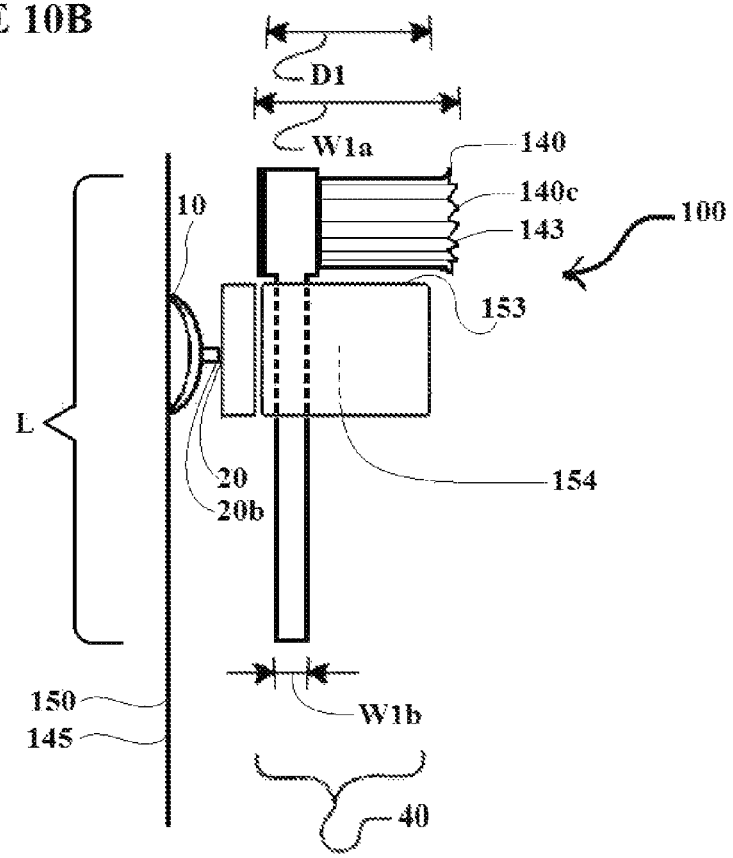
FIG. 10B shows an end view of one embodiment of a suction cup snap ring securing device with a suction cup, connector, and bi-stable snap action ribbon spring while in a stable coiled state securing an article against a vertical surface.

FIGS. 10A and 10B represent and portray all features and aspects of FIGS. 9A and 9B except that the connector (20) shown in FIGS. 10A and 10B is portrayed that of as an adhesive (20b). The adhesive (20b) connector (20) may be any conceivable substance used for connecting the suction cup (10) to the bi-stable snap action ribbon spring (30). Furthermore, FIGS. 10A and 10B differ from that of FIGS. 9A and 9B in that since a circular ring-type connector (20a) is not used, there is no need for a hole (15) in the suction cup (10) and similarly, there is no need for the hole (25) in the bi-stable snap action ribbon spring (30). All other aspects of the suction cup snap-spring securing device (100) including descriptions thereof and methods and manners of use are identical between FIGS. 9A and 10A and 9B and 10B, respectively. Therefore a full and enabling disclosure including the best mode known to the inventor for all aspects and features illustrated in FIGS. 10A and 10B is provided above in the description of FIGS. 9A and 9B.

Figure 11A:
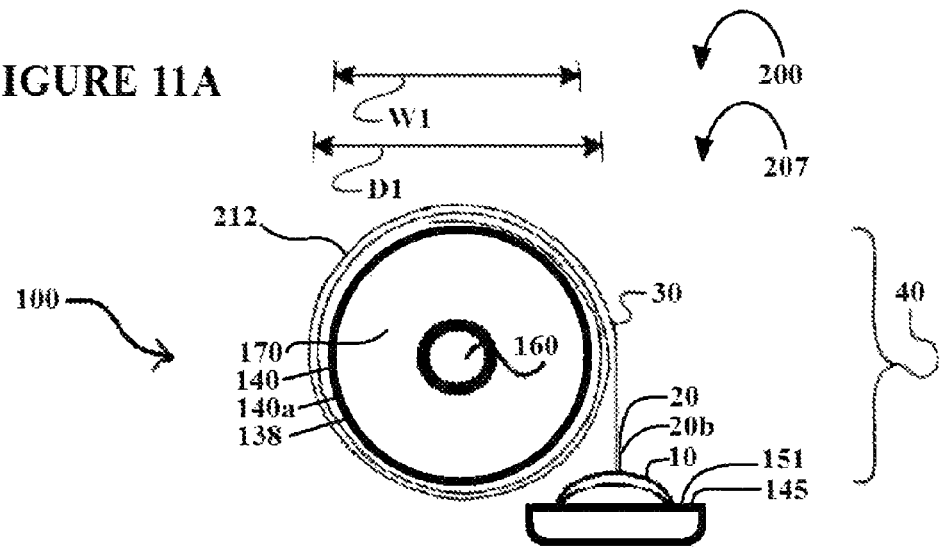
FIG. 11A depicts a top plan view of one embodiment of a suction cup snap ring securing device with suction cup, connector, and bi-stable snap action ribbon spring while in a stable coiled state securing an article against a surface.
Figure 11B:
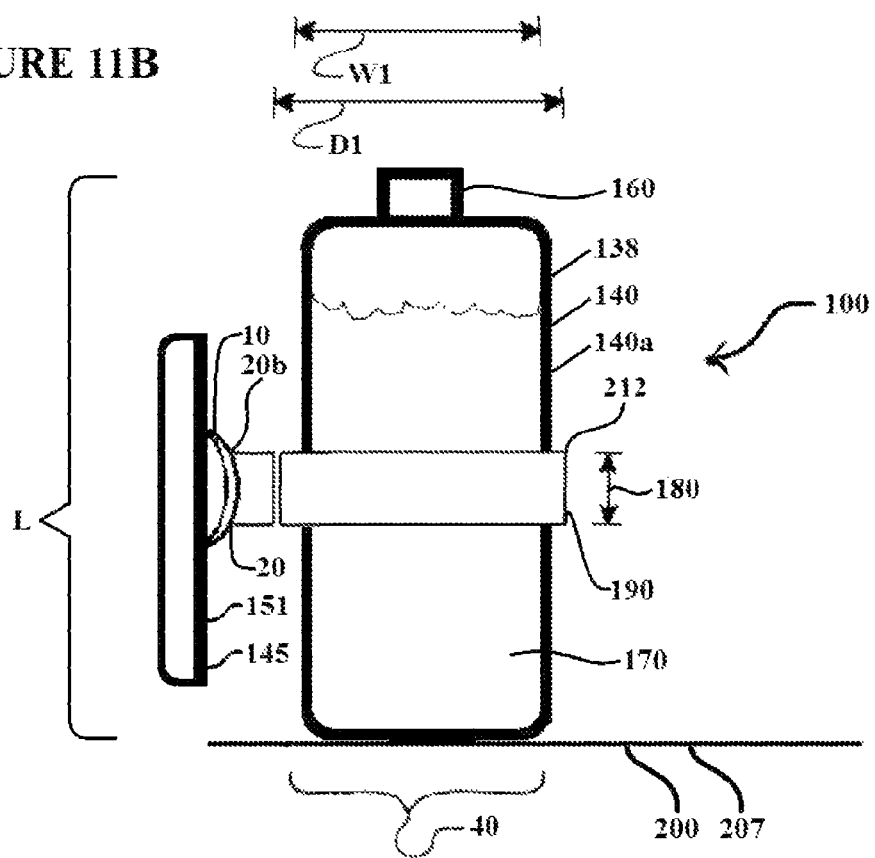
FIG. 11B shows an end view of one embodiment of a suction cup snap ring securing device with suction cup, connector, and bi-stable snap action ribbon spring while in a stable coiled state securing an article against a surface while the article also rests upon a horizontal surface.

FIG. 11A depicts a top plan view of the suction cup snap-spring securing device (100) with a suction cup (10), connector (20), and bi-stable snap action ribbon spring (30) while in a stable coiled state (40). The bi-stable snap action ribbon spring (30) also has a sheath (212) covering its entire outside surface. Further, the embodiment shown in FIGS. 11A and 11B show the sheath (212) made up of a synthetic rubber material such as neoprene. The sheath (212) covering the bi-stable snap action ribbon spring (30) also functions as the adhesive (20b) connector (20) for securing the suction cup (10) to the bi-stable snap action ribbon spring (30). FIG. 11A illustrates the suction cup snap-spring securing device (100) securing or holding an article (140) such as a hollow container (140a), such as a water bottle (138), while the suction cup (10) is secured to a vertical surface (145), such as a the front or back of a smart phone (151). Use of the suction cup snap-spring securing device (100) to hold or secure a water bottle (138) to a smart phone (151) permits easy consolidated storage of both items (138 and 151) on a horizontal surface (200), such as a floor (207), in a fitness center setting. FIG. 11A also displays the width (W1) of the article (140) being lesser than the coiled spring inner diameter (D1) and resultantly the bi-stable snap action ribbon spring (30) wraps around the circumference of the hollow container (140a) so as to secure it to the suction cup (10) which is in turn secured to the vertical surface (145) as in the front or back of a smart phone (151).

FIG. 11B shows an end view of the suction cup snap-spring securing device (100) (of FIG. 11A) displaying a coiled spring width (180) while in a stable coiled state (40). FIG. 11B shows the hollow container (140a) secured by the suction cup snap-spring securing device (100) in a right-side-up orientation. FIGS. 11A and 11B also display the width (W1) of the article (140) being lesser than the coiled spring inner diameter (D1) and resultantly the bi-stable snap action ribbon spring (30) wraps around the circumference of the hollow container (140a) so as to secure the article (140) to the suction cup (10) which is in turn secured to the vertical surface (145) that being the front or back of a smart phone (151).

REFERENCE NUMERALS suction cup (10)
hole (15)
connector (20)
circular ring-type connector (20a)
adhesive (20b)
hole (25)
bi-stable snap action ribbon spring (30)
stable coiled state (40)
tensile force (50)
linear portion (60)
user-induced "snap" (70)
stable linear state (80)
spring length (90)
suction cup snap-spring securing device (100)
suction cup diameter (110)
linear spring width (120)
arcuate cross-sectional shape (130)
water bottle (138)
shampoo bottle (139)
article (140)
hollow container (140a)
solid object (140b)
candle (141)
flame (142)
brush (143)
vertical surface (145)
wall (150)
smart phone (151)
horizontal surface of the coiled spring (153)
center region (154)
slanted surface (155)
side of bathtub (156)
opening (160)
liquid (170)
spring width (180)
flat cross-sectional shape (190)
horizontal surface (200)
bathtub ledge (205)
fireplace mantle (206)
floor (207)
floor (208)
downward direction (210)
sheath (212)
coiled spring inner diameter (D1)
length (L)
width (W1)
larger width (W1a)
smaller width (W1b)

Obviously many modifications and variations of the invention, as hereinbefore set forth, may be made without departing from the spirit and scope thereof and, therefore, only such limitations should be imposed as are indicated in the appended claims.

What is claimed is:

1. A suction cup snap-spring securing device (100) for selectively securing an article, comprising:
    a bi-stable snap action ribbon spring (30) having a first end (FE) and a second end (SE), and selectively occupies either a stable linear state (80) or a stable coiled state (40);
    a suction cup (10); and
    a connector (20) connecting the first end (FE) of the bi-stable snap action ribbon spring (30) to the suction cup (10), wherein:
    in the stable coiled state (40), the bi-stable snap action ribbon spring (30) secures an article (140) with the second end (SE) in contact with said article (140); and
    in the stable linear state (80), the bi-stable snap action ribbon spring (30) no longer secures the article (140) and the second end (SE) is free of said article (140).

2. A method of securing an article (140) against a vertical surface (145), the method comprising:
    providing the suction cup snap-spring securing device (100) of claim 1;
    securing the suction cup (10) against a vertical surface (145); and,
    transitioning the bi-stable snap action ribbon spring (30) from a stable linear state (80) to a stable coiled state (40) with a user-induced "snap" (70) so as to secure an article (140) in the center region (154) of the stable coiled state (40).

3. The method according to claim 2, comprising:
    supporting the secured article (140) upon a horizontal surface (200).

4. A method of securing an article (140) against a horizontal surface (200), the method comprising:
    providing the suction cup snap-spring securing device (100) of claim 1;
    securing the suction cup (10) against a horizontal surface (200); and,
    transitioning the bi-stable snap action ribbon spring (30) from a stable linear state (80) to a stable coiled state (40) with a user-induced "snap" (70) so as to secure an article (140) in the center region (154) of the stable coiled state (40).

5. The method according to claim 4, comprising:
    supporting the secured article (140) upon a horizontal surface (200).

6. A method of supporting an article (140) upon the horizontal surface (200) of the coiled spring (153), the method comprising:
    providing the suction cup snap-spring securing device (100) of claim 1;
    securing the suction cup (10) against a vertical surface (145);
    transitioning the bi-stable snap action ribbon spring (30) from a stable linear state (80) to a stable coiled state

(40) with a user-induced "snap" (70) so as to provide a center region (154) having a coiled spring inner diameter (D1);

inserting an article (140) having a smaller width (W1b) into center region (154);

supporting said article (140) that also has a larger width (W1a) upon the horizontal surface of the coiled spring (153); and, wherein the larger width (W1a) is greater than the coiled spring inner diameter (D1).

7. The method according to claim 6, wherein the article (140) is a solid object (140b).

8. The method according to claim 7, wherein the solid object (140b) is a brush (143).

9. A method of securing an article (140) against a slanted surface (155), the method comprising:

providing the suction cup snap-spring securing device (100) of claim 1;

securing the suction cup (10) against a slanted surface (155); and, transitioning the bi-stable snap action ribbon spring (30) from a stable linear state (80) to a stable coiled state (40) with a user-induced "snap" (70) so as to secure an article (140) in the center region (154) of the stable coiled state (40).

10. The method according to claim 9, comprising:

supporting the secured article (140) upon a horizontal surface (200).

11. The suction cup snap-spring securing device (100) according to claim 1, wherein:

the bi-stable snap action ribbon spring (30) is formed from metal.

12. The suction cup snap-spring securing device (100) according to claim 1, further comprising a sheath (212) that covers at least a portion of the bi-stable snap action ribbon spring (30).

13. The suction cup snap-spring securing device (100) according to claim 1, wherein the suction cup (10) is formed from plastic or synthetic rubber.

14. The suction cup snap-spring securing device (100) according to claim 12, wherein the sheath (212) and the suction cup (10) are both formed from plastic or synthetic rubber.

15. The suction cup snap-spring securing device (100) according to claim 12, wherein the sheath (212) covers an entire outside surface of the spring (30).

* * * * *